J. E. KELLENBERGER.
AUTOMOBILE TRANSMISSION GEARING.
APPLICATION FILED FEB. 21, 1916.
1,247,279.
Patented Nov. 20, 1917.
2 SHEETS—SHEET 2.
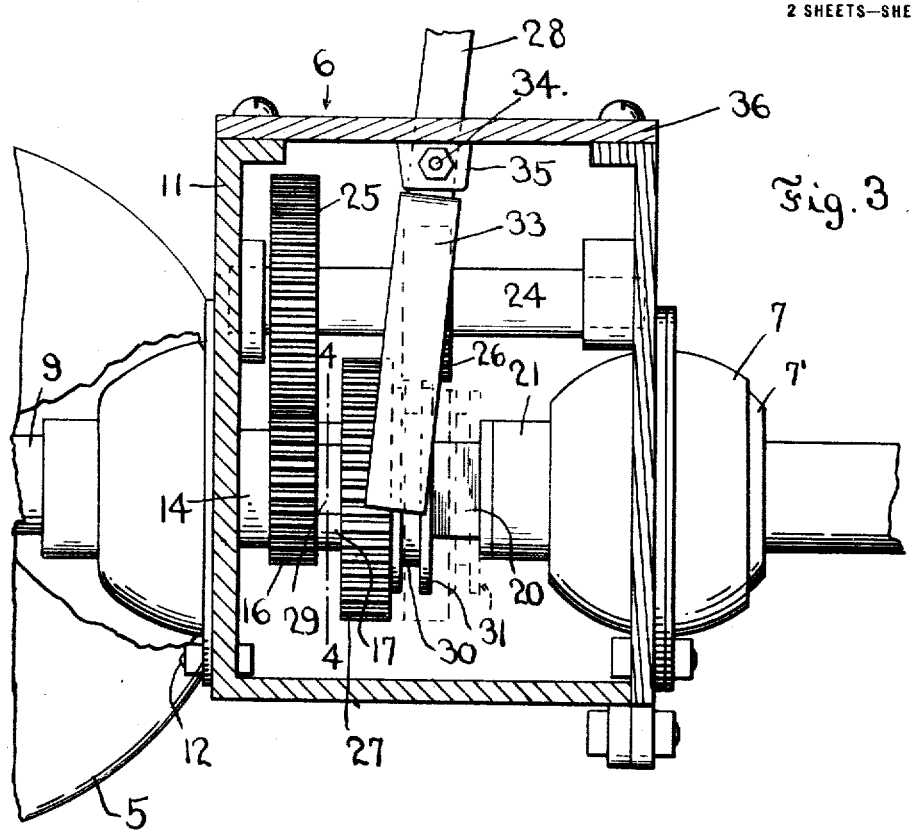
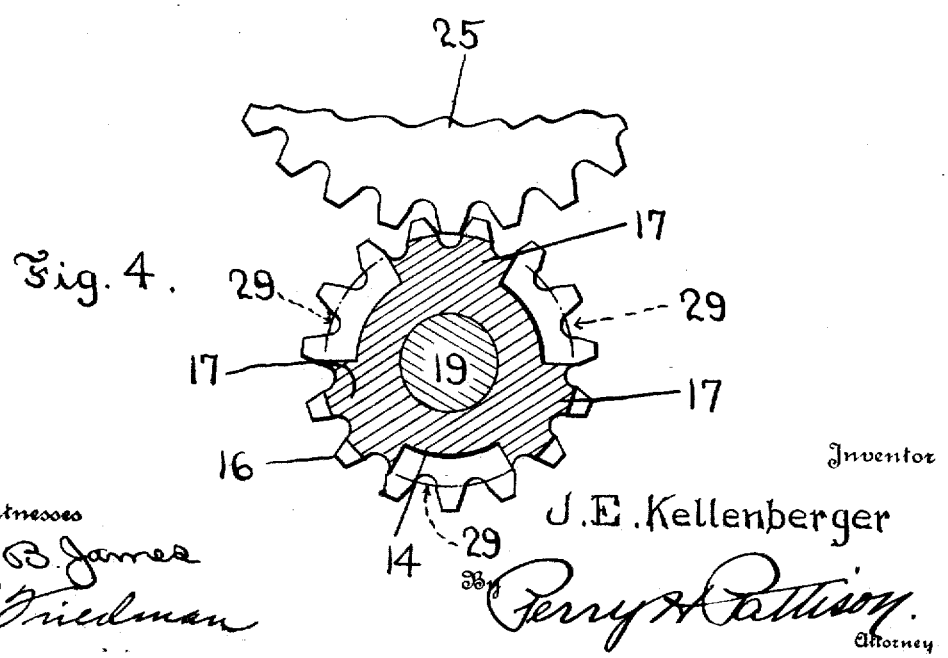
Inventor
J. E. Kellenberger
Witnesses

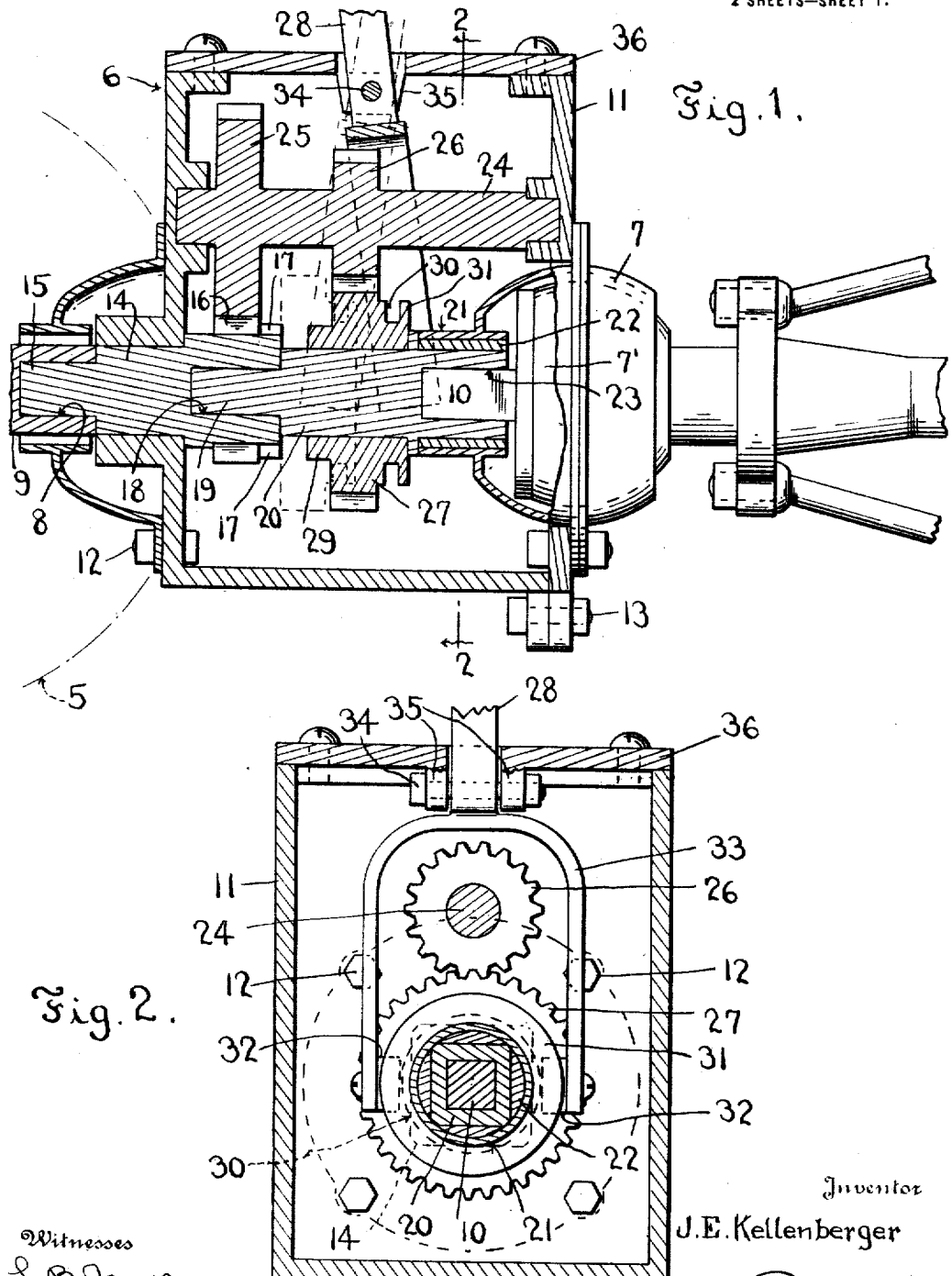

UNITED STATES PATENT OFFICE.

JAMES E. KELLENBERGER, OF PENDLETON, OREGON, ASSIGNOR TO THE KELLENBERGER MANUFACTURING COMPANY, OF SPOKANE, WASHINGTON, A CORPORATION.

AUTOMOBILE TRANSMISSION-GEARING.

1,247,279.  Specification of Letters Patent.  Patented Nov. 20, 1917.

Application filed February 21, 1916. Serial No. 79,780.

*To all whom it may concern:*

Be it known that I, JAMES E. KELLENBERGER, a citizen of the United States, residing at Pendleton, in the county of Umatilla and State of Oregon, have invented certain new and useful Improvements in Automobile Transmission-Gearing, of which the following is a specification.

This invention relates to automobile transmission gearing and more especially one adapted for use on the Ford type of automobile.

The primary object of this invention resides in the provision of means whereby the utilization of the same will enable an operator of a Ford automobile to attain an intermediate speed between high and low gear.

Another object of this invention resides in the provision of certain mechanical elements which can be readily attached to the present Ford transmission mechanism at a minimum expense.

A still further object of this invention resides in the provision of certain elements which when it is desired to assemble them upon Ford automobiles will readily be applicable thereto, without destroying the initial function of its present power transmitting means.

In the accompanying drawings; Figure 1 is a vertical sectional view through the casing which contains the supplemental power transmitting means, the same being shown as attached to the present universal joint and power shaft of the Ford automobile;—Fig. 2 is a transverse sectional view thereof on line 2—2 of Fig. 1;—Fig. 3 is a vertical sectional view through the casing of the supplemental power transmitting means showing the shiftable power gear as connected directly with the power shaft of the usual transmission gear;—Fig. 4 is a vertical sectional view on line 4—4 of Fig. 3.

Referring to the present embodiment of this invention, the numeral 5 designates the transmission casing adopted in the construction of the Ford type of automobiles, but it is to be understood that the mechanism of this invention designated as a whole by the numeral 6 is readily applicable to other types of cars wherein the same functions will be produced.

In applying the aforesaid mechanism of this invention to a Ford automobile, the aforesaid transmission casing 5 is separated from the present universal joint casing 7 thereof a sufficient distance, to permit its connection to the squared socket 8 of the power shaft 9 and the squared stud 10 of the universal joint $7^1$.

To maintain the mechanism of this invention in a rigid position, its casing 11 is secured at one end as at 12 to said transmission casing 5 and at its opposite end to the casing 7 of the universal joint as at 13.

Rotatably carried by said casing 11 is a supplemental power transmitting stub shaft 14 having a reduced angular stud 15 adapted to permanently engage the socket 8 of the power shaft 9 and carrying thereon a fixed gear 16 to the rear of which is formed a series of lugs 17 for a purpose that will be hereinafter set forth.

Formed in said supplemental stub shaft 14 at the end opposite to that upon which the stud 15 is carried is a cylindrical socket 18, in which is rotatably engaged a cylindrical stud 19 of a second supplemental stub shaft 20.

This stub shaft 20 is rotatably suspended between the aforesaid first mentioned supplemental stub shaft 14 and the collar 21 of the casing 7 of the universal joint $7^1$. Said collar 21 is provided with a cylindrical bushing 22. Mounted on the supplemental stub shaft 20 at that end opposite to the one carrying the cylindrical stud 19, is an angular socket 23 adapted to permanently engage the angular stud 10 of the universal joint $7^1$.

Rotatably carried by said casing 11 is a shaft 24 having fixed thereto a gear 25 which is adapted to permanently engage the aforesaid gear 16 of the supplemental stub shaft 14, while a second gear 26 of less diameter is carried thereby for engagement with the gear 27, which is slidably mounted on the squared portion of said supplemental stub shaft 20 and adapted to be moved into and out of engagement with said gear 26 by a lever designated by the numeral 28.

Integrally formed upon that face of the gear 27 which is opposed to the gear 16, is a series of lugs 29 similar in construction to those carried by said gear 16 said lugs being adapted to engage to rotate the supplemental stub shafts 14 and 20 at the same speed when said gear 27 is moved out of engagement with the gear 26 and to the forward limit of its movement.

In order that this gear 27 may be readily moved upon the supplemental stub shaft 20, an annular groove 30 is formed in a collar 31 carried upon its rear face and is adapted to receive blocks 32 which are pivotally supported by the free ends of a yoke 33 carried by the lower extremity of said operating lever 28.

To attain the proper throw of the aforesaid lever, it is fulcrumed as at 34 to lugs 35 carried by the cover 36 of the casing 11.

With the above mechanism, it will be observed that the power from the present adopted transmission mechanism of the Ford automobile can either be imparted to the rear axle at the same ratio of speed attained heretofore or by releasing the direct connection between the stub shaft 20 and the stub shaft 14 and connecting them through the medium of gears 27, 26, 25 and 16, the transmission can be changed to an intermediate speed.

I claim.

1. In an automobile change speed gearing, the combination of a power shaft, a driven shaft, stub shafts fixedly secured to the opposed ends of said shafts, the stub shafts being rotatably engaged one with the other, a universal joint interposed between sections of said driven shaft, an annularly flanged housing for the power shaft, an annularly flanged housing for the universal joint, a change speed gear set casing interposed between said housings and secured to the flanges thereof, means for rotating said stub shafts in unison, and means for changing the relative ratio of speed of the same.

2. In an automobile change speed gearing, the combination of an engine driven power shaft, a driven shaft, stub shafts fixedly secured to opposed ends of said shafts, the stub shafts being rotatably engaged one with the other, a universal joint for said driven shaft, an annularly flanged housing for the power shaft, an annularly flanged housing for the universal joint, a change speed gear set casing interposed between said housings and secured to the flanges thereof, bearings supported by said casing and said universal joint housing, said stub shafts being journaled therein, means for rotating said stub shafts in unison, and means for changing the relative speed ratio of the same.

3. In an automobile change speed gearing, the combination of an engine driven power shaft, a driven shaft, stub shafts fixedly secured to opposed ends of said shafts, the stub shafts being rotatably engaged one with the other, a universal joint for said driven shaft, an annularly flanged housing for the power shaft, an annularly flanged housing for the universal joint, a change speed gear set casing interposed between said housings and secured to the flanges thereof, bearings supported by said casing and said universal joint housing, said stub shafts being journaled therein, a fixed and a slidable gear carried by said stub shafts, a counter shaft mounted in said casing, gears carried thereby adapted to coöperate with said fixed and slidable gears, and means for shifting said slidable gear into locked engagement with said fixed gear and into toothed engagement with one of said counter shaft gears, selectively.

In testimony whereof I affix my signature in the presence of two witnesses.

JAMES E. KELLENBERGER.

Witnesses:
N. R. McMATH,
IVA BLACK.

Copies of this patent may be obtained for five cents each, by addressing the "Commissioner of Patents, Washington, D. C."